L. VAN GILDER.
DRIVING SPINDLE CONNECTION.
APPLICATION FILED MAY 19, 1917.
1,261,325.
Patented Apr. 2, 1918.
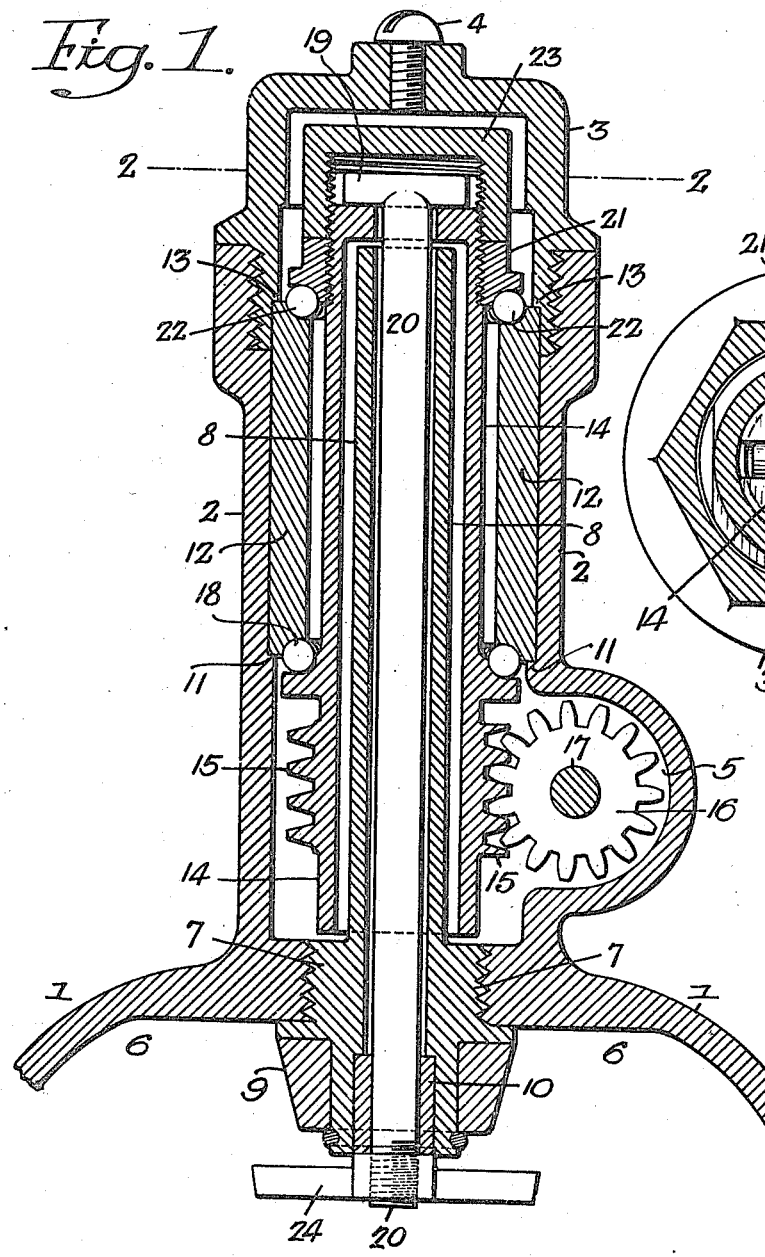
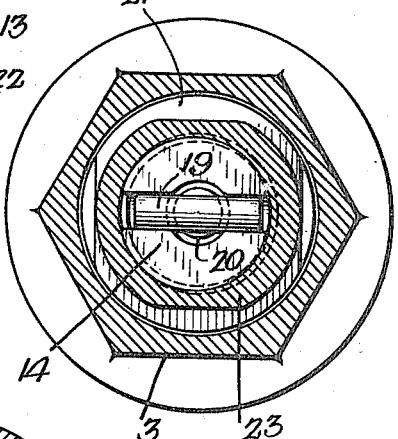
Inventor:—
Lincoln Van Gilder.
by his Attorneys,
Howson & Howson

UNITED STATES PATENT OFFICE.

LINCOLN VAN GILDER, OF VENTNOR, NEW JERSEY.

DRIVING-SPINDLE CONNECTION.

1,261,325.	Specification of Letters Patent.	Patented Apr. 2, 1918.

Application filed May 19, 1917. Serial No. 169,747.

*To all whom it may concern:*

Be it known that I, LINCOLN VAN GILDER, a citizen of the United States, residing in Ventnor, Atlantic county, State of New Jersey, have invented a Driving-Spindle Connection, of which the following is a specification.

One object of my invention is to provide a train of power transmitting elements particularly designed for use in connecting the registering or indicating mechanism of a water meter with the actuating element or gearing thereof, which shall have its parts so arranged as to permit of their convenient and accurate assembly and also avoid the likelihood of any of said parts binding or jamming under operating conditions.

It is further desired to provide a power transmitting connection in which the parts shall be of such design as to occupy the proper relative positions when assembled, without the necessity for extreme accuracy of construction;—the invention particularly contemplating an arrangement of parts designed to transmit power through the lubricant-retaining trap of a water or other meter of the general type described and claimed in my Patent #1,189,020, dated June 27, 1916.

These objects and other advantageous ends I secure as hereinafter set forth, reference being had to the accompanying drawings, in which, Figure 1 is a vertical section on a somewhat enlarged scale, illustrating the preferred arrangement and construction of parts constituting my invention; and Fig. 2 is a horizontal section on the line 2—2, Fig. 1.

In the above drawings 1 represents a portion of the main casing of a water or other meter and this, in accordance with my invention, is provided with an upwardly projecting tubular extension 2 open at the top and internally threaded for the reception of a cap or cover 3 whereby it may be hermetically closed. This cap is provided with a vent screw 4 which may be removed to allow of the escape of air whenever this is advisable or necessary.

As described in my patent above referred to, the lower portion of the tubular extension 2 communicates through a lateral duct 5 with the chamber containing the registering or indicating mechanism of the meter and it is understood that this latter as well as the duct and the extension 2 are at all times filled to a predetermined level with suitable lubricant. The bottom of the extension 2 opens into the chamber 6 of the water meter through a threaded passage into which is screwed the correspondingly threaded flange 7 of the lower end of a tube 8 and this extends upwardly to or immediately adjacent the level of the top end of the part 2.

Within the chamber 6 the lower end of this tubular structure 7 and 8 carries a guide cone 9 and has a bearing bushing 10 set concentrically within the enlarged lower end of its passage or bore. Within the casing extension 2, at a suitable distance above the bottom thereof, is provided a shoulder 11 designed to support a ball race sleeve 12 whose upper end is engaged by a second shoulder 13 of the cap 3 so that when the latter is put in place said bearing sleeve is rigidly and immovably retained in position.

Extending down over the inner tube 8 to within a short distance of the bottom of the extension 2 is an outer tube or shell 14 having a worm 15 formed on or mounted upon its lower portion in position to engage and drive a gear 16 fixed to a spindle 17 which extends through the lateral duct 5 into the registering chamber of the meter. A short distance above the worm this outer sleeve is provided with a race, and anti-friction rollers, preferably in the form of balls 18, are confined between this and a correspondingly formed race provided in the lower end of the sleeve 12.

The upper end of the outer sleeve 14 is transversely slotted for the reception of a T-head 19 fixed to or forming part of a driving spindle 20 which extends through an opening in the upper end of said outer tube, down through the inner tube 8 and the guiding bearing 10 into the main chamber 6 of the meter. A cone or race nut 21 is threaded on the upper end of the outer sleeve 14 and a second series of rollers 22 is confined between this and the upper end of the race sleeve 12. A retaining cap 23 is also screwed onto the upper end of the sleeve 14 so as to not only lock the nut 21 in position but also to seal or make an airtight closure on the upper end of said sleeve.

The lower end of the driving spindle has screwed on it a driving arm 24 of the usual construction, and in assembling the parts constituting my invention, the inner tube 8 with the guide cone 9 is first screwed into the meter case so that there is a liquid tight joint between the flanged part 7 of said tube and the part of the meter case 1 which it engages. The ball race sleeve 12 is then placed over the end of the outer sleeve 14 and the lower series of balls 18 is put in position between it and the lower race of said latter sleeve. The race or cone nut 21 is then screwed on the upper end of the outer sleeve and the upper series of balls 22 is put in place between it and the race on the upper end of the race sleeve 12; said nut being then set up so that both sets of balls are properly engaged and retained. The spindle 20 is then placed within the outer sleeve 14 with its T-head 19 in the transverse slot 25 thereof, after which the cap 23 is screwed in place to serve as a jam or check nut for the nut 21 and also to seal the upper end of the outer sleeve 14.

The outer sleeve with the above noted attached parts is then placed within the tubular extension 2 where it is held in a definite position by reason of the engagement of the lower end of the race sleeve 12 with the shoulder 11;—under which condition the worm 15 meshes with the teeth of the gear 16. The driving arm 24 is then screwed onto the lower end of the driving spindle 20 and after the extension 2 has been filled with lubricant to a level below the upper end of the inner tube 8 and above the series of balls 22, the cap 3 is screwed into said extension, thus effectually sealing it. If necessary the screw 4 may be removed when the meter is to be put in operation to permit of the introduction of the lubricant and allow the escape of air.

Under conditions of operation, the driving mechanism of the meter in engagement with the arm 24 turns the spindle 20, and through the head 19 of the latter also rotates the outer sleeve 14. Such revolution through the worm wheel 15, gear 16 and lateral spindle 17 drives the registering mechanism in the meter, which, as described in my patent above mentioned, is at all times immersed in lubricant owing to the trap provided by the parts 2, 14 and 8. Not only are the elements of my device so mounted as to be free to turn with a minimum of friction, but owing to the loose connection between the head 19 of the driving spindle and the outer sleeve 14, there is no tendency of the lower end of the latter to get out of alinement or jam.

I claim:—

1. The combination of a spindle having a head; a sleeve having a recess in one end formed to make a loose driving connection with said head; a rotary member; and means for transmitting power between the sleeve and said member.

2. The combination of a spindle having a head; a sleeve having a recess in one end formed to make a loose driving connection with said head; a rotary member; means for transmitting power between the sleeve and said member; with means for laterally supporting said spindle some distance from the head.

3. The combination of a rotatably supported sleeve transversely slotted at one end; with a spindle extending concentrically through said sleeve and provided with a laterally extending head making a loose driving connection with the sleeve.

4. The combination of a structure including an inner tube open at the top; an outer tube closed at the top and extending around said inner tube; with a spindle extending through the inner tube and making a loose driving connection with the outer tube.

5. The combination of a structure including an inner tube open at the top; an outer tube extending around said inner tube and having a recess at its upper end; a cap normally closing said recess; with a spindle extending through the inner tube and extending in said recess to make a loose driving connection with the outer tube.

6. The combination of a structure including an inner tube open at the top; an outer tube closed at the top and extending around said inner tube; a spindle extending through the inner tube and connected to the outer tube; a casing surrounding the outer tube; and an anti-friction bearing between the latter tube and said casing.

7. The combination of a structure including an inner tube open at the top; an outer tube closed at the top and extending around said inner tube; a spindle extending through the inner tube and making a loose driving connection with the outer tube; a casing surrounding the outer tube; a race sleeve mounted in said casing; and an anti-friction bearing between said race sleeve and the outer tube.

8. The combination of a structure including an inner tube open at the top; an outer tube closed at the top and extending around said inner tube; a spindle extending through the inner tube and making a loose driving connection with the outer tube; a casing surrounding the outer tube; a race sleeve mounted in said casing; anti-friction bearings between said race sleeve and the outer tube; with a closure for said casing clamping said race sleeve in position.

9. The combination of a casing including a tubular extension; a tube threaded into the lower part of said extension and open at the top; a second tube closed at the top and extending over said first tube; bearings between the second tube and the casing extension; a spindle extending through said first tube and making a loose driving connection with the second tube; and means for transmitting power from the lower portion of the second tube.

10. The combination of a casing having a tubular extension and including an inner tube open at the top; a closure for said extension; an outer tube extending over the inner tube and having a recess in its upper end; a race sleeve mounted in the casing extension and clamped in place by the closure; anti-friction elements between said sleeve and the lower part of the outer tube; a nut on the upper part of the outer tube; a second series of anti-friction bearings between said nut and said race sleeve; a driving spindle extending through the inner tube and loosely entering the recess in the upper end of the outer tube; a cap sealing the end of the outer tube and holding said nut in place thereon; with means for transmitting power from said outer tube.

In witness whereof I affix my signature.

LINCOLN VAN GILDER.

Copies of this patent may be obtained for five cents each, by addressing the "Commissioner of Patents, Washington, D. C."